Patented Mar. 15, 1949

2,464,198

UNITED STATES PATENT OFFICE 2,464,198

PROCESS FOR PREPARING A CHEMICAL COMPOSITION FOR WATER PURIFICATION

Goldsmith Hall Conant, Jr., Cambridge, and John Carrell Morris, Sudbury, Mass., assignors to the United States of America as represented by the Secretary of War No Drawing. Application August 24, 1945, Serial No. 612,542

8 Claims. (Cl. 167—17)

This invention relates to a water disinfectant composition and more particularly to an improved method of preparing such a composition.

Prior investigation has revealed that diglycine hydriodide, the reaction product of two molecular equivalents of glycine and one molecular equivalent of hydriodic acid, when finely ground with elemental iodine, forms a readily water-soluble powder having greater stability than fixed alkali periodides. Compositions comprising diglycine hydriodide and elemental iodine have a tendency to lose free iodine upon exposure in tropical climates and the stability of such compositions, therefore, is not as good as the improvement herein set forth.

It is the principal object of this invention to provide a composition of diglycine hydriodide and elemental iodine having increased stability, particularly with regard to resistance to both humidity and dry heat. Another object of this invention is to provide a composition of the class described which does not readily lose free iodine upon exposure. Other objects and advantages of this invention will be apparent from the following description of the invention.

This invention is based on the discovery that the stability of compositions consisting of diglycine hydriodide and elemental iodine may be greatly increased and the tendency to lose free iodine upon exposure decreased by adding one molecular equivalent of glycine to a mixture of one molecular equivalent of diglycine hydriodide and one molecular equivalent of elemental iodine, and thereafter forming a slurry of this mixture with a suitable solvent such as water or alcohol. It has been found that a minimum of two molecular equivalents of ethanol are required when it is employed as the solvent for a mixture containing molecular equivalents of glycine, iodine, and diglycine hydriodide. The optimum quantity of ethanol, however, is approximately four molecular equivalents and, while greater quantities may be used satisfactorily, it is economically unfeasible.

A convenient method of preparation is to mix 278 parts of diglycine hydriodide and 254 parts of iodine with 75 parts of glycine. The mixture is reduced to a slurry with 200 parts of ethyl alcohol and dried at approximately 100° F. with occasional stirring. The dried powder thus obtained may be used in powder form or tablets may be prepared from this dried powder in accordance with standard procedures. It is desirable to employ a suitable acidic binding and dispersing agent, such as disodium dihydrogen pyrophosphate, sodium dihydrogen phosphate, citric acid, and tartaric acid, with a tabletizing lubricant such as talc and starch, to formulate a tablet suitable for disinfecting water for drinking purposes. A tablet compounded for this purpose should contain approximately 8 mg. of iodine per liter of water for optimum results.

Having thus described our invention, what we claim as new and wish to secure by Letters Patent is:

1. A process for making a water disinfectant comprising mixing equal molecular equivalents of glycine, diglycine hydriodide, and iodine, forming a slurry of said mixture with ethanol and drying said slurry.

2. A process for making a water disinfectant powder comprising mixing equal molecular equivalents of glycine, diglycine hydriodide, and iodine, forming a slurry of said mixture with ethanol, and drying said slurry while stirring.

3. A process for making a water disinfectant comprising mixing equal molecular equivalents of glycine, diglycine hydriodide and iodine, forming a slurry of said mixture with more than twice the molecular equivalent of ethanol, and drying said slurry.

4. The process of preparing a composition of matter for purifying water to render impure water potable, which comprises mixing one molecular equivalent of glycine with a mixture containing one molecular equivalent of diglycine hydriodide and one molecular equivalent of iodine, forming a slurry of the resulting mixture in a solvent selected from the group consisting of water and ethanol, and drying the said slurry.

5. The process of preparing a water-purifying composition for rendering water potable, which comprises mixing one molecular equivalent of glycine with a mixture containing one molecular equivalent of diglycine hydriodide and one molecular equivalent of iodine, forming a slurry of the resulting mixture with ethanol, and drying the slurry.

6. The process of preparing a water-purifying composition for rendering water potable, which comprises mixing one molecular equivalent of glycine with a mixture containing one molecular equivalent of diglycine hydriodide and one molecular equivalent of iodine, forming a slurry of the resulting mixture with from two to four molecular equivalents of ethanol, and drying the slurry.

7. The process of preparing a water-purifying composition for rendering water potable, which comprises mixing one molecular equivalent of glycine with a mixture containing one molecular equivalent of diglycine hydriodide and one molecular equivalent of iodine, forming a slurry of the resulting mixture with from two to four molecular equivalents of ethanol, drying the slurry, incorporating in the slurry a nontoxic acidic binder, and forming the resulting composition into a tablet.

8. The process of preparing a water-purifying composition for rendering water potable, which comprises mixing one molecular equivalent of glycine with one molecular equivalent of diglycine hydroidide and one molecular equivalent of iodine, forming a slurry of the resulting mixture with from two to four molecular equivalents of ethanol, drying the slurry, and producing a tablet from the resulting composition.

GOLDSMITH HALL CONANT, JR.
JOHN CARRELL MORRIS.

REFERENCES CITED

The following references are of record in the file of this patent:

UNITED STATES PATENTS

| Number | Name | Date |
|---|---|---|
| 2,281,612 | Witte | May 5, 1942 |
| 2,385,394 | Witte | Sept. 25, 1942 |